US005580535A

United States Patent [19]

Hoke et al.

[11] Patent Number: 5,580,535
[45] Date of Patent: Dec. 3, 1996

[54] SYSTEM AND METHOD FOR ABATEMENT OF FOOD COOKING FUMES

[75] Inventors: Jeffrey B. Hoke, Brunswick; Matthew P. Larkin, Cranbury; Robert J. Farrauto, Westfield; Kenneth E. Voss, Somerville; Robert E. Whiteley, Upper Montclair; Leonard M. Quick, Bridgewater, all of N.J.

[73] Assignee: Engelhard Corporation, Iselin, N.J.

[21] Appl. No.: 271,709

[22] Filed: Jul. 7, 1994

Related U.S. Application Data

[63] Continuation-in-part of Ser. No. 973,461, Nov. 19, 1992, abandoned, which is a continuation-in-part of Ser. No. 798,437, Nov. 26, 1991, abandoned.

[51] Int. Cl.$^6$ ............... B01J 8/00; B01J 23/00; B01J 23/56
[52] U.S. Cl. .............. 423/245.3; 502/304; 502/332; 502/333
[58] Field of Search .................. 502/304, 439, 502/238, 263, 332–334; 423/245.3

[56] References Cited

U.S. PATENT DOCUMENTS

| | | | |
|---|---|---|---|
| 3,161,605 | 12/1964 | Beck et al. | 252/455 |
| 3,428,434 | 2/1969 | Hurko | 23/288 |
| 3,785,778 | 1/1974 | Burstein | 23/288 |
| 3,933,684 | 1/1976 | Petrow et al. | 252/447 |
| 3,993,572 | 11/1976 | Hindin et al. | 252/462 |
| 3,993,597 | 11/1976 | Stiles | 252/454 |
| 4,021,185 | 5/1977 | Hindin et al. | 431/7 |
| 4,023,928 | 5/1977 | Haensel | 21/74 R |
| 4,123,391 | 10/1978 | Noguchi et al. | 252/466 |
| 4,138,220 | 2/1979 | Davies et al. | 422/173 |
| 4,163,894 | 8/1979 | Scherer | 219/391 |

(List continued on next page.)

FOREIGN PATENT DOCUMENTS

| | | |
|---|---|---|
| 6769990 | 6/1991 | Australia . |
| 251708 | 1/1988 | European Pat. Off. . |
| 321949 | 6/1989 | European Pat. Off. . |
| 462593 | 7/1990 | European Pat. Off. . |
| 377290 | 7/1990 | European Pat. Off. . |
| 399891 | 11/1990 | European Pat. Off. . |
| 404385 | 12/1990 | European Pat. Off. . |
| 0571161 | 11/1993 | European Pat. Off. . |
| 2264180 | 11/1975 | France . |
| 2546770 | 12/1984 | France . |
| 2663241 | 12/1991 | France . |
| 3238129 | 5/1983 | Germany . |
| 3340682 | 5/1985 | Germany . |
| 3447481 | 7/1986 | Germany . |

(List continued on next page.)

OTHER PUBLICATIONS

G. M. Cornetti et al, SAE Paper #880715, US Transient Cycle Versus ECE R.49 13–Mode Cycle, Feb. 29, 1988.
M. Horiuchi et al, SAE Paper #900600, The Effects Of Flow–Through Type Oxidation Catalysts On The Particulate Reduction of 1990's Diesel Engines, Feb. 1990, pp. 183–193.

*Primary Examiner*—Shrive Beck
*Assistant Examiner*—Fred J. Parker

[57] ABSTRACT

A method for treating cooking fumes to oxidize oxidizeable particulate and gaseous components thereof includes contacting the fumes with a catalytic material containing ceria and alumina each having a BET surface of at least about 10 $m^2/g$, for example, ceria and activated alumina in a weight ratio of from about 1.5:1 and 1:1.5 and a BET surface area of from about 25 $m^2/g$ to 200 $m^2/g$. Optionally, a catalytic metal component such as platinum or palladium may be included in the catalytic material. The foodstuffs cooking fumes are contacted with the catalyst composition (22 or 40) at a temperature of 200° C. to 600° C. to promote the oxidation of both particulate (atomized) animal and/or vegetable oils and fats and oxidizeable gas phase components of the fumes. Optionally, a separate, supplemental gas phase oxidation catalyst (42) may be used in conjunction with and downstream of the above-described catalyst (40) to provide a two-catalyst system for treating cooking fumes.

17 Claims, 5 Drawing Sheets

U.S. PATENT DOCUMENTS

| | | | |
|---|---|---|---|
| 4,171,289 | 10/1979 | Wheelock | 252/466 |
| 4,189,404 | 2/1980 | Keith et al. | 252/462 |
| 4,200,552 | 4/1980 | Noguchi et al. | 252/466 |
| 4,477,417 | 10/1984 | Domesle et al. | 423/213.2 |
| 4,492,769 | 1/1985 | Blanchard et al. | 502/262 |
| 4,581,343 | 4/1986 | Blanchard et al. | 502/241 |
| 4,613,583 | 9/1986 | Koch et al. | 502/252 |
| 4,621,071 | 11/1986 | Blanchard et al. | 502/302 |
| 4,707,341 | 11/1987 | Koch et al. | 422/171 |
| 4,714,694 | 12/1987 | Wan et al. | 502/304 |
| 4,749,671 | 6/1988 | Saito et al. | 502/64 |
| 4,757,045 | 7/1988 | Turner et al. | 502/252 |
| 4,759,918 | 7/1988 | Homeier et al. | 423/213.5 |
| 4,782,038 | 11/1988 | Gandhi et al. | 502/304 |
| 4,849,399 | 7/1989 | Joy, III et al. | 502/333 |
| 4,857,088 | 8/1989 | Mizrah et al. | 55/523 |
| 4,927,799 | 5/1990 | Matsumoto et al. | 502/303 |
| 4,929,581 | 5/1990 | Steinwandel et al. | 502/2 |
| 4,940,685 | 7/1990 | Sauvion et al. | 502/263 |
| 5,000,929 | 3/1991 | Horiuchi et al. | 423/213.5 |
| 5,041,272 | 8/1991 | Tamura et al. | 423/239 |
| 5,045,332 | 9/1991 | Graf et al. | 426/332 |
| 5,059,575 | 10/1991 | Jorgensen et al. | 502/304 |
| 5,081,095 | 1/1992 | Bedford et al. | 502/304 |
| 5,094,222 | 3/1992 | Fukuda et al. | 126/19 R |
| 5,124,304 | 6/1992 | Blanchard et al. | 502/304 |
| 5,145,825 | 9/1992 | Deeba | 502/242 |
| 5,209,218 | 5/1993 | Daneshvar et al. | 126/391 |
| 5,280,749 | 1/1994 | Smit | 99/422 |
| 5,283,041 | 2/1994 | Nguyen et al. | 423/240 |

FOREIGN PATENT DOCUMENTS

| | | |
|---|---|---|
| 4016688 | 6/1991 | Germany. |
| 560520 | 10/1979 | Japan. |
| 59022650 | 7/1982 | Japan. |
| 59-142851 | 8/1984 | Japan. |
| 61086944 | 10/1984 | Japan. |
| 03213150 | 1/1990 | Japan. |
| 1204423 | 9/1970 | United Kingdom. |
| 1530152 | 10/1978 | United Kingdom. |
| 2070959 | 9/1981 | United Kingdom. |
| 2122912 | 1/1984 | United Kingdom. |
| 2035826 | 6/1990 | United Kingdom. |
| 2236493 | 4/1991 | United Kingdom. |

SYSTEM AND METHOD FOR ABATEMENT OF FOOD COOKING FUMES

CROSS-REFERENCES TO RELATED APPLICATIONS

This application is a continuation-in-part of application Ser. No. 07/973,461, filed Nov. 19, 1992, now abandoned, in the names of Robert J. Farrauto, Kenneth E. Voss and Ronald M. Heck and entitled "Improved Ceria-Alumina Oxidation Catalyst and Method of Use", which in turn is a continuation-in-part of application Ser. No. 07/798,437, filed Nov. 26, 1991, now abandoned, in the names of the same three inventors and entitled "Improved Diesel Exhaust Oxidation Catalyst and Method of Using The Same".

BACKGROUND OF THE INVENTION

1. Field of the Invention

This invention relates to a method for the oxidation of oxidizeable components of a gas-borne stream, and more specifically to the treatment of cooking fumes to reduce the pollutants content thereof.

2. Description of the Related Art

Ongoing efforts to protect the environment from polluting by-products of commercial activities have led to concern regarding the release of particulate emissions from food cooking operations. The cooking of food generates large quantities of cooking fumes which include particulate emissions, such as droplets of grease and cooking oils, carbon monoxide and hydrocarbon-derived gases including reactive organic gases. If left untreated, these pollutants are released into the air. Conventional approaches to removing particulate pollutants from cooking fumes involve filtration of the fumes by water scrubbers or various types of filters. Filtration, however, is an expensive and inefficient method for abatement of particulate emissions, particularly in applications where the volume of particulate emissions is high.

As an alternative to filtration, some attempts have been made to catalytically convert the components of cooking fumes to less noxious species. For example, French Patent FR 2 663 241 discloses a method for treating air that has been contaminated by vapors released during deep fat frying of food, the method including passing the air through a mechanical filter, an electrostatic filter and an oxidation catalyst comprising platinum and alumina.

U.S. Pat. No. 4,138,220 discloses a method and apparatus for catalytically oxidizing grease, fats, oils and/or other hydrocarbons in fumes emanating from sources such as a cooking grill or the like. The disclosed apparatus may include a honeycomb structure having a platinum-containing catalyst material coated thereon.

U.S. Pat. No. 5,094,222 discloses a catalytic composite, and a food cooker containing such catalytic composite, for decomposing fats and oils by oxidation. A silicon oxide or aluminum oxide anodic oxidation film is formed on an air-permeable metal support and an oxidation catalyst is carried on the surface of the anodic oxidation film. The oxidation catalyst is selected from the group consisting of an oxide of one or more of manganese, iron, cobalt, nickel, copper, lanthanum and cerium.

SUMMARY OF THE INVENTION

Generally, in accordance with the present invention, there is provided a catalyst composition and a method for oxidizing oxidizeable components of a gas-borne stream, especially particulate grease, fats and oils, e.g., for treating cooking fumes to convert at least some of the oxidizeable components thereof to innocuous materials such as $H_2O$ and $CO_2$. The method comprises contacting the fumes with a catalyst composition comprising bulk ceria and bulk alumina and, optionally, a catalytic metal component, at a temperature high enough to catalyze the oxidation of at least the particulate grease, fats and oils ("particulates") components of the fumes. In some embodiments one or both of the ceria and the alumina are stabilized against thermal degradation and in other embodiments the catalyst composition consists essentially of the bulk ceria and bulk alumina and, optionally, the catalytic metal, e.g., platinum.

The desired temperature may be attained by heating one or both of the fumes and the catalyst composition.

The present invention also provides a system for purifying cooking fumes, the system containing a catalyst as aforesaid for primarily treating particulates placed in series flow with a catalyst designed to catalyze the oxidation of the gaseous components of the cooking fumes.

Specifically, in accordance with the present invention, there is provided a method for treating fumes produced by cooking foodstuffs by oxidizing oxidizeable components of the fumes. The method comprises contacting the fumes with a catalyst composition at a temperature high enough to oxidize at least some oxidizeable components of the fumes, and the catalyst composition comprises a refractory carrier on which is disposed a coating of a ceria-alumina catalytic material. The catalytic material comprises a combination of ceria having a BET surface of at least about 10 $m^2/g$, preferably 25 to 200 $m^2/g$, and alumina having a BET surface of at least about 10 $m^2/g$, preferably 25 to 200 $m^2/g$. Optionally, the catalytic material may also contain a catalytically effective amount of a catalytic metal component dispersed thereon, e.g., one or more Group VIII catalytic metal components such as one or more platinum group metal components. The ceria and alumina may each comprise from about 5 to 95 percent by weight of the combination, e.g., from about 10 to 90 percent by weight or from about 35 to 65 percent by weight.

The ceria and the alumina of the catalyst composition used in the method of the invention may each be disposed in respective discrete layers, one overlying the other, or may be disposed in intimate admixture with each other.

In one aspect of the invention, the catalytic material comprises the catalytically effective amount of catalytic metal component, e.g., platinum or palladium, dispersed thereon. The platinum group metal component may, for example, comprise platinum in an amount of at least about 0.1 $g/ft^3$ of the composition, e.g., in an amount of from about 5 $g/ft^3$ to about 80 $g/ft^3$ of the composition or palladium in the amount of from about 0.1 to 200 $g/ft^3$ of the composition. Lesser amounts of catalytic metal may be used in some circumstances, e.g., the platinum catalytic component in the amount of 0.1 to 5 $g/ft^3$ or 0.1 to 15 $g/ft^3$ of the composition.

Other aspects of the present invention include heating one or both of the fumes to be treated and the catalyst composition so as to contact the fumes with the catalyst composition at a temperature of from about 200° C. to 600° C.

In another aspect of the present invention, the fumes comprise oxidizeable gases and the method further includes contacting the fumes with a gas phase oxidation catalyst after contacting the fumes with the above-described catalyst composition to oxidize at least some of the oxidizeable gases.

In accordance with yet another aspect of the present invention, there is provided a system for purifying fumes produced by cooking foodstuffs, which system comprises a particulates phase catalyst composition arranged in series flow relation relative to the fumes to be purified with a gas phase catalyst composition. The particulates phase catalyst composition comprises a catalyst composition as described above and the gas phase catalyst composition comprises any suitable oxidation catalyst, e.g., a catalyst containing a Group VIII catalytic metal.

Other aspects of the invention will be apparent from the following description.

As used herein and in the claims, the following terms shall have the indicated meanings.

The term "fumes" means a gaseous stream produced upon cooking foodstuffs which may contain gaseous components and non-gaseous components such as solid particulates and/or vapors, liquid mist or droplets, and/or solid particulates wetted by a liquid. Cooking fumes are believed to comprise at least some of the following components: animal and/or vegetable oils, carbon monoxide, hydrocarbon-derived compounds including aliphatic compounds such as olefins, aromatic compounds, some of which are sometimes collectively referred to in the art as a reactive organic gas ("ROG") component that may comprise, e.g., gaseous alcohols, aldehydes, etc. All such gases susceptible to treatment by oxidation catalysts as herein described at a temperature of 200° C. to 600° C. are collectively referred to as "oxidizeable gases".

The term "BET surface area" has its usual meaning of surface area as determined by the Brunauer, Emmett, Teller method of $N_2$ adsorption. Unless otherwise specifically stated, all references herein to the surface area of a ceria, alumina or other component refer to the BET surface area.

The term "activated alumina" has its usual meaning of a high BET surface area alumina, comprising primarily one or more of γ-, θ- and δ-aluminas (gamma, theta and delta).

The term "catalytically effective amount" means that the amount of catalytic material present in a composition is sufficient to increase the rate of reaction of the oxidation of pollutants in the fumes being treated as compared to an otherwise identical composition which lacks the catalytic material.

The term "inlet temperature" means the temperature of the fumes, test gas or other stream being treated immediately prior to initial contact of the fumes, test gas or other stream with the catalyst composition.

The term "ceria-alumina catalytic material" means a combination of ceria particles and alumina particles each having a BET surface area of at least about 10 $m^2$/g, i.e., a combination of high surface area bulk ceria and high surface area bulk alumina, sometimes referred to as "activated alumina".

The term "combination" when used with reference to the combination of ceria and alumina refractory metal oxides includes combinations attained by mixtures or blends of the oxides as well as superimposed discrete layers of the oxides.

The term "aluminum-stabilized ceria" means ceria which has been stabilized against thermal degradation by incorporation therein of an aluminum compound. A suitable technique for doing so is disclosed in U.S. Pat. No. 4,714,694 of C. Z. Wan et al, the disclosure of which is incorporated by reference herein, in which ceria particles are impregnated with a liquid dispersion of an aluminum compound, e.g., an aqueous solution of a soluble aluminum compound such as aluminum nitrate, aluminum chloride, aluminum oxychloride, aluminum acetate, etc. After drying and calcining the impregnated ceria in air at a temperature of, e.g., from about 300° C. to 600° C. for a period of ½ to 2 hours, the aluminum compound impregnated into the ceria particles is converted into an effective thermal stabilizer for the ceria. The term "aluminum-stabilized" is used for economy of expression although the aluminum is probably present in the ceria as a compound, presumably alumina, and not as elemental aluminum.

Reference herein or in the claims to a refractory inorganic oxide such as ceria or alumina being in "bulk" form means that the oxides, e.g., the ceria or alumina is present as discrete particles (which may be, and usually are, of very small size, e.g., 10 to 20 microns in diameter or even smaller) as opposed to having been dispersed in solution form into another component. For example, the thermal stabilization of ceria particles (bulk ceria) with alumina as described above with respect to U.S. Pat. No. 4,714,694 results in the alumina being dispersed into the ceria particles and does not provide the dispersed alumina in "bulk" form, i.e., as discrete particles of alumina.

As used herein or in the claims, "Group VIII metal" catalytic component includes catalytically active forms (usually the element, alloy or oxide) of one or more of iron, cobalt, nickel ruthenium, rhodium, palladium, osmium, iridium and platinum, and "platinum group metal" means and includes platinum, palladium, rhodium, iridium, osmium and ruthenium.

DETAILED DESCRIPTION OF THE INVENTION AND PREFERRED EMBODIMENTS THEREOF

Figure 1:
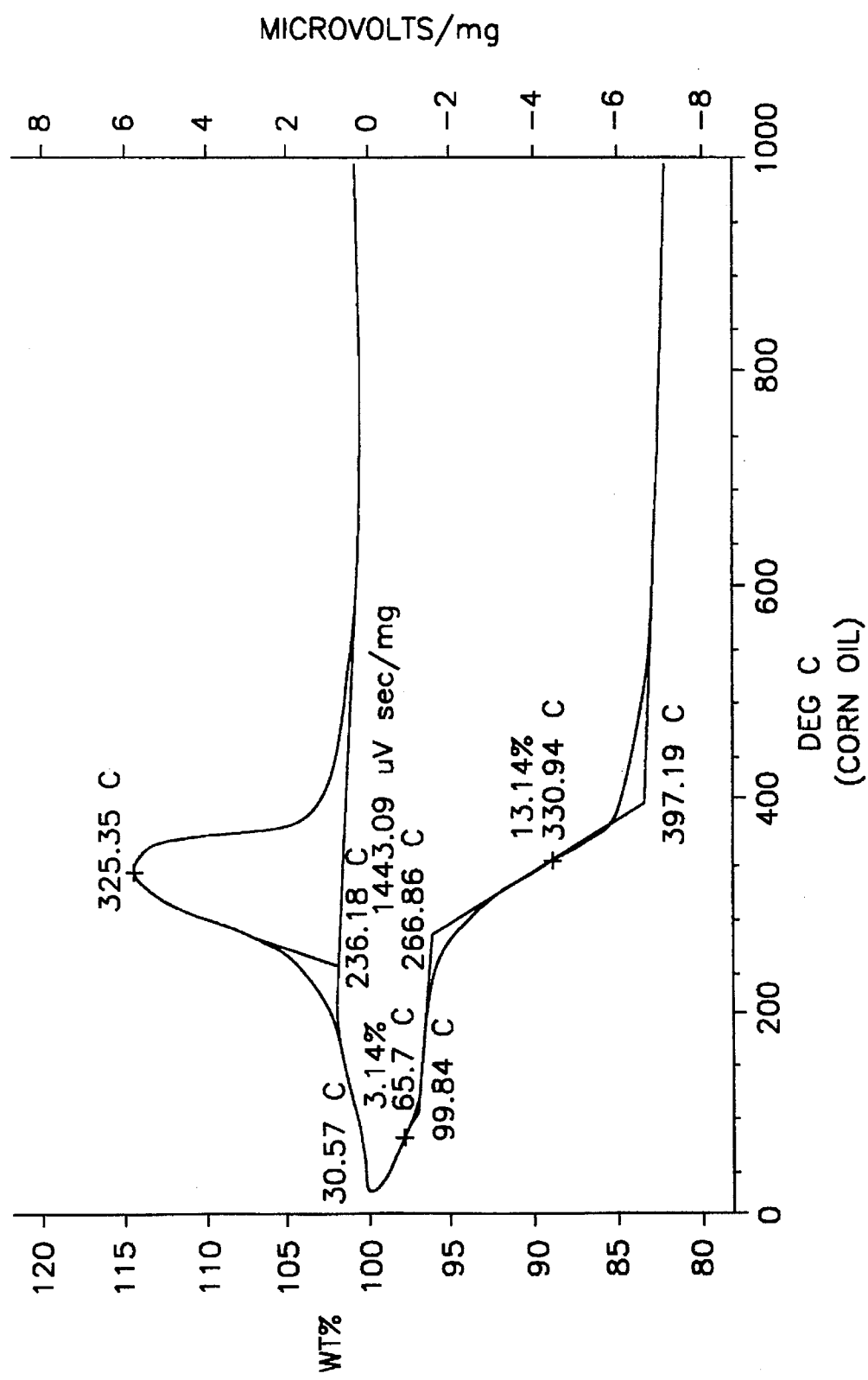
FIGS. 1, 2 and 3 are plots showing weight loss on the left-side ordinates and exothermic release on the right-side ordinates with temperature on the abscissae, for TGA/DTA analyses of catalytic materials used in one embodiment of the present invention with corn oil (FIG. 1), canola oil (FIG. 2) and diesel lube oil (FIG. 3), respectively.

Generally, the present invention relates to a method for treating cooking fumes to abate the pollutants therein by contacting the fumes with a catalytic material as described herein. The catalytic material comprises a combination of bulk ceria and bulk alumina and may optionally further comprise a catalytically active platinum group metal component. Cooking fumes, especially those engendered by frying, especially deep oil frying, or broiling, especially of fowl or meat, engenders both oil and grease particulates as well as gaseous pollutants such as hydrocarbon-derived gases, reactive organic gases and carbon monoxide, i.e., oxidizeable gases.

One novel characteristic of the present invention is believed to reside in a catalyst and method for purifying cooking fumes in which the catalyst comprises a combination, e.g., a mixture, of bulk ceria and bulk alumina as a catalytic material, without the addition of a platinum group metal catalytic component thereto. It is preferred that the bulk ceria and the bulk alumina will each have a surface area of at least about 10 m²/g, preferably at least about 20 m²/g. For example, the bulk alumina may comprise activated alumina and may have a surface area of from about 120 to 180 m²/g and the bulk ceria may have a surface area of from about 70 to 150 m²/g. It has been found that, in accordance with one aspect of the present invention, surprisingly, a combination of high surface area bulk alumina and a high surface area bulk ceria provides a catalytic material which effectively catalyzes the oxidation of certain components of cooking fumes, e.g., the particulate components, so as to provide a significant reduction in total cooking fume emissions. It should be noted that the prior art generally considers refractory base metal oxides such as alumina and ceria to be merely supports for the dispersal thereon of catalytically active metals such as platinum group metals. In contrast, the present invention teaches that a catalytic material consisting essentially of a combination of bulk ceria and bulk alumina of sufficiently high surface area (10 m²/g or higher as described above) dispersed as a thin coating on a suitable carrier, provides an effective cooking fume oxidation catalyst which is effective for catalyzing the oxidation of particulate (e.g., aerosol droplets) of animal and vegetable greases, oils and fats. The addition of a platinum group metal or other catalytic metal species thereon is optional, but provides greater efficacy in also converting oxidizeable gaseous components of the cooking fumes to innocuous substances. As used herein, "innocuous substances" include $H_2O$ and carbon dioxide. Thus, beneficial effects are attained by the optional incorporation of suitable catalytic metal components, e.g., platinum and/or palladium, and/or oxides of iron, nickel and/or cobalt, in the ceria-alumina catalytic materials described above.

The method of the present invention may be achieved by contacting cooking fumes with the catalyst materials of the present invention at a temperature high enough to catalyze the oxidation of at least the particulate oil fraction of the fumes. Typically, the operating temperature is from about 200° C. to 600° C., preferably from about 200° C. to 400° C.

The catalytic materials of the present invention may take the form of a carrier or substrate, sometimes in the art referred to as a "honeycomb" structure and described below in more detail, on which the catalytic material is dispersed as a coating.

The Catalytic Materials

The catalytic materials used in accordance with the present invention may be rendered in the form of an aqueous slurry of fine particles of ceria and alumina which, in some embodiments, may be impregnated with a solution or other dispersion of a platinum group metal compound. Typically, the refractory metal oxide particles are mixed with water and an acidifier such as acetic acid, nitric acid or sulfuric acid, and ball milled to a desired particle size. The slurry is then applied to a suitable carrier, dried and calcined to form a catalytic material coating (sometimes called a "washcoat") thereon.

When the optional catalytic metal component is used with the combination of ceria and alumina, the catalytic metal component may be dispersed onto the alumina particles or onto both the ceria and alumina particles. In the latter case, the ceria-alumina combination acts not only as a catalyst but also as a support for the optional platinum catalytic metal component. Such incorporation of platinum group metal may be carried out after the ceria-alumina catalytic material is coated as a washcoat onto the carrier, dried and calcined, by impregnating the calcined coated carrier with e.g., a solution of a suitable platinum compound, followed by drying and calcining the impregnated ceria-alumina coating. However, preferably, the alumina particles or both the ceria and alumina particles are impregnated with a suitable catalytic metal or metals compound or compounds before a coating of the ceria-alumina catalytic material is applied to the carrier. In either case, the optional catalytic metal component may be added to the ceria-alumina catalytic material as, e.g., one or more solutions of soluble metal compound(s), the solution(s) serving to impregnate the ceria and alumina particles (or the ceria-alumina coating on the carrier), which may then be dried and the catalytic metal component fixed thereon. Fixing may be carried out by calcination or by treatment with hydrogen sulfide or by other known means, to render the catalytic metal component in water-insoluble form.

Generally, the slurry of admixed ceria and alumina particles, whether or not impregnated with a catalytic metal component, will be deposited upon the carrier substrate which is then dried and calcined to adhere the catalytic material to the carrier and, when the catalytic metal component is present, to revert the catalytic metal component to the elemental metal or its oxide. For example, in the case of a platinum catalytic metal component, suitable platinum compounds for use in the foregoing process include potassium platinum chloride, ammonium platinum thiocyanate, amine-solubilized platinum hydroxide and chloroplatinic acid; these and other platinum compounds and compounds of other platinum group metals, e.g., palladium, rhodium, etc. as well as compounds of other catalytic metals suitable for the purpose, are well-known in the art. During calcination, or at least during the initial phase of use of the catalyst, such compounds, if present, are converted into the catalytically active elemental metals or oxides.

When the catalytic material is applied as a thin coating to a suitable carrier, as described below, the proportions of ingredients are conventionally expressed as weight of material per unit volume of catalyst, as this measure accommodates the presence of different sizes of catalyst composition voids provided by different carrier wall thicknesses, gas flow passages, etc. Grams per cubic inch ("g/in³") units are used to express the quantity of relatively plentiful components such as the ceria-alumina catalytic material, and grams per cubic foot ("g/ft³") units are used to express the quantity of the sparsely used ingredients, such as the platinum metal. For typical cooking fume applications, the ceria-alumina catalytic material of the present invention generally may comprise from about 0.25 to about 4.0 g/in³, preferably from about 0.25 to about 3.0 g/in³ of the coated carrier substrate, optionally including a catalytic metal component such as platinum in amounts of from about 0 to about 90 g/ft³, preferably from about 0 to 25 g/ft³, of platinum calculated as the elemental metal.

Generally, other ingredients may be added to the catalyst composition of the present invention such as conventional thermal stabilizers for the refractory inorganic oxides. For example, it is known that high surface area alumina can be thermally stabilized with rare earth metal oxides such as ceria and bulk ceria can be stabilized with alumina. Thermal stabilization of high surface area ceria and alumina to militate against phase conversion to less catalytically effective low surface area forms is well-known in the art. Such thermal stabilizers may be incorporated into the bulk ceria or into the bulk activated alumina, by impregnating the ceria (or alumina) particles with, e.g., a solution of a soluble compound of the stabilizer metal, for example, an aluminum nitrate solution in the case of stabilizing bulk ceria or a cerium nitrate solution in the case of stabilizing alumina. Such impregnation is then followed by drying and calcining the impregnated particles. Thus, for example, ceria particles impregnated with aluminum nitrate are calcined to convert the aluminum nitrate impregnated therein into alumina.

In addition, the catalyst compositions of the invention may contain other catalytic ingredients such as other base metal promoters or the like. However, in one embodiment, the catalyst composition of the present invention consists essentially only of the high surface area ceria and high surface area alumina, preferably present in a weight proportion of 1.5:1 to 1:1.5, with or without thermal stabilizers impregnated therein, and, optionally, platinum or palladium.

The Carrier (Substrate)

The carrier used in this invention should be relatively inert with respect to the catalytic material dispersed thereon. Typically, carriers comprise a body having a plurality of fine, parallel gas flow passages extending therethrough, on the walls of which is applied a coating of the catalytic material of the invention. One class of carriers is comprised of refractory ceramic-like materials such as cordierite, α-alumina, silicon nitride, zirconia, mullite, spodumene, alumina-silica-magnesia or zirconium silicate. Another class of carriers is comprised of suitable metals such as stainless steel, for example, 321 stainless, or an Alpha-4 alloy, or aluminum or aluminum alloys. The carriers are preferably of the type sometimes referred to as honeycomb or monolithic carriers, comprising a unitary body having a plurality of fine, substantially parallel gas flow passages extending therethrough and connecting both end-faces of the carrier to provide a parallel flow path "flow-through" type of carrier. Such monolithic carriers may contain up to about 700 or more flow channels ("cells") per square inch of cross section, although far fewer may be used. For example, the carrier may have from about 7 to 600, more usually from about 50 to 400, e.g., 60 to 100, cells per square inch ("cpsi").

While this discussion and the following examples relate to flow-through type carrier substrates, wall-flow carriers (filters) or tortuous flow path carriers (foam, mesh, etc.) may also be used. Wall-flow carriers are generally similar in structure to flow-through carriers, with the distinction that each channel is blocked at one end of the carrier body, with alternate channels blocked at opposite end-faces. Wall-flow carrier substrates and the support coatings deposited thereon are necessarily porous, as the exhaust must pass through the walls of the carrier in order to exit the carrier structure. Foams and meshes provide a tortuous flow path of the gases flowed therethrough. Because pressure drop is a significant consideration in treating cooking fumes, parallel flow path flow-through channels are preferred as they generally impose a lower pressure drop on the gases flowed therethrough than do other types of carriers. For this reason, relatively short flow path, large end face and relatively coarse (50 to 100 cpsi) carriers are preferred.

The catalyst-bearing substrate, sometimes referred to herein as a catalyst member, is contacted with a gas stream containing particulate emissions from a food preparation process, i.e., cooking fumes. Generally, the temperature of the catalyst must be at least about 200° C. to obtain satisfactory results. Often, the cooking operation will provide fumes of 200° C. or higher and supplemental heating is not required. However, since cooking fumes sometimes do not attain such temperatures, or the configuration of a particular cooking arrangement may result in significant temperature loss by the fumes by the time they reach the catalyst member, it may be necessary to heat the fumes and/or the catalyst member at least intermittently during the purification process. For example, a catalyst member comprising a substrate coated with a catalytic material according to the present invention may be fitted above a conveyorized charbroiler of the kind commonly found in fast food restaurants. Fumes generated from broiling of foodstuffs on the conveyor is emitted from the broiler and is passed through the catalyst member. The temperature of the fumes is usually over 200° C. but the catalyst member may be heated, if necessary, by any convenient means, for example, electrically or by a heating jacket surrounding the catalyst member or a flue which conducts the fumes to the catalyst member. The invention may be employed in other food-preparation environments, e.g., for the treatment of fumes produced in the production of baked goods or any other cooked foods.

Alternatively, a catalyst member in accordance with the present invention may be placed in any suitable structure such as a hood or a flue in the exhaust of a cooking facility where it can accumulate particulate emissions and condensate from the cooking fumes by adsorption of these materials onto the catalytic material coating of the catalyst member. Periodically, such catalyst member may be heated to temperatures in the range of about 200° C. to 600° C., e.g., about 230° C. to 300° C., at which temperatures the adsorbed material will be catalytically oxidized.

Gas Phase Treatment

The catalyst member of the present invention, especially the embodiments thereof which contain a catalytic metal component, are efficacious for treating at least some of the oxidizeable gas components of cooking fumes as well as the particulate components thereof. Nonetheless, in some situations it may be desirable to supplement the catalyst member of the present invention with a separate catalyst to treat the gaseous pollutant components of the cooking fumes. In this type of arrangement there is provided a system for purifying cooking fumes comprising a catalyst member in accordance with the present invention as described above, followed in series cooking fume-flow communication by a gas phase oxidation catalyst, e.g., a catalytic metal-containing catalyst such as (but not necessarily) a platinum-containing version of the ceria-alumina catalyst of the present invention. In one embodiment, the gas phase oxidation catalyst may be intermittently or continuously heated to an active temperature, e.g., about 400° C., to facilitate conversion to innocuous substances of the gas phase pollutant emissions of the cooking fumes. Such optional heating of the gas phase catalyst, and/or of the fumes introduced thereto, may be carried out on a continuous basis in order to facilitate conversion of the gas phase oxidizeable gases to innocuous substances on an ongoing basis. Preferably, the optional gas phase oxidation catalyst comprises a catalytic metal, e.g., platinum group metal, component in an amount sufficient to enhance the conversion activity of the gas phase catalyst composition for oxidizeable gases even at the relatively low temperatures (200° C. to 600° C.) used in treating cooking fumes.

System For Purifying Cooking Fumes

As noted above, satisfactory treatment of cooking fumes is attained by use of the only ceria-alumina catalyst member of the present invention which is efficacious for treating the particulate phase pollutants of cooking fumes and, especially when the optional catalytic metal component is employed, the gas phase pollutants, i.e., oxidizeable gases. A typical installation of only the catalyst of the present invention in a restaurant charbroiler environment is illustrated schematically in FIG. 4.

Figure 4:
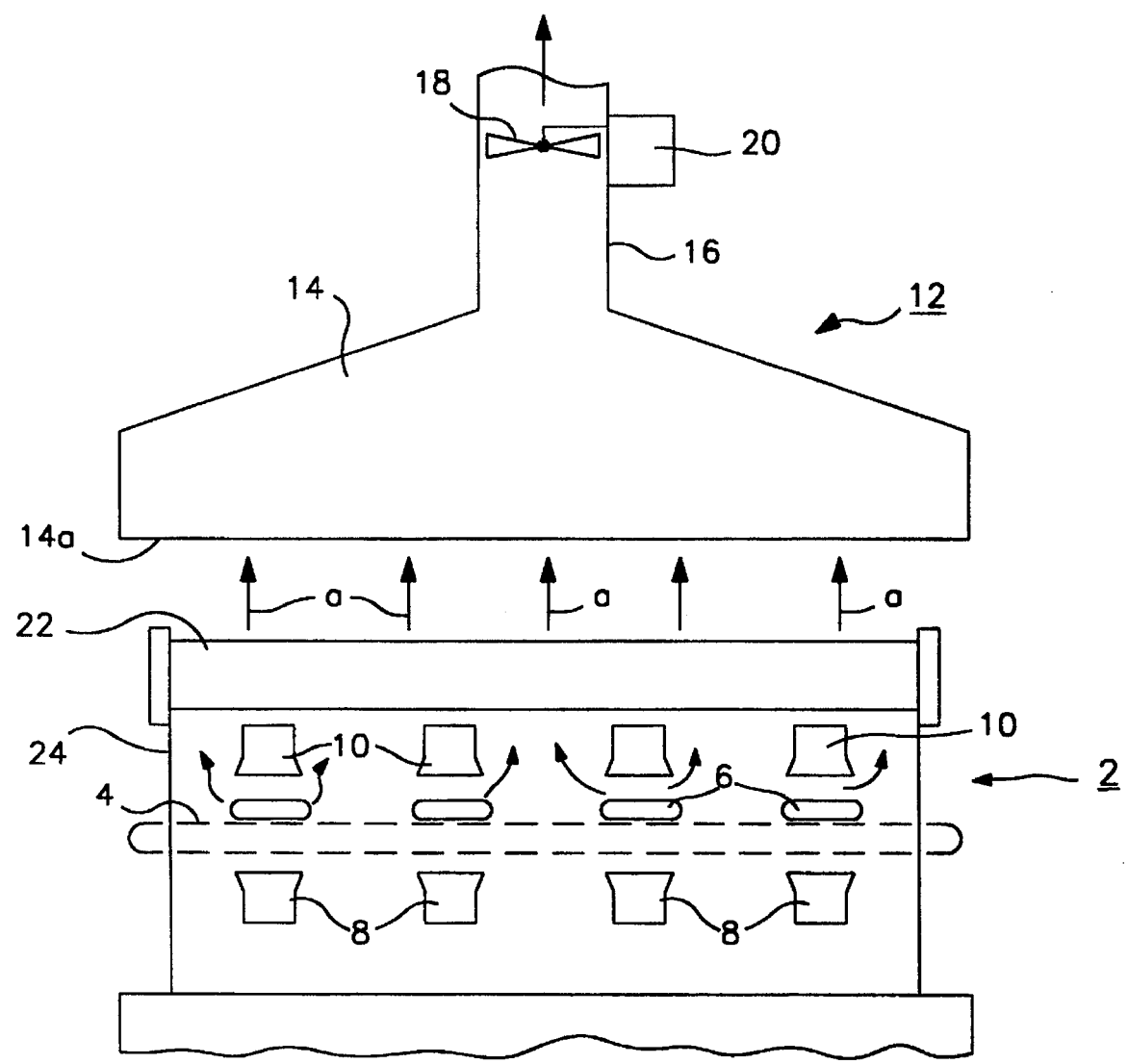
FIG. 4 is a schematic view of a restaurant char-broiler system fitted with a catalyst for purifying cooking fumes in accordance with one embodiment of the present invention.

As illustrated schematically in FIG. 4, there is shown a conventional charbroiler 2 with a conveyor chain 4, on which articles of food 6, such as hamburgers, steaks, chicken, fish or other food items, are being broiled by heat sources 8, 10. A fume exhaust system 12 is disposed above the charbroiler 2 and comprises a hood 14 having a fume collecting inlet 14a. Hood 14 tapers inwardly in a direction moving upwardly away from the charbroiler 2 for connection to an outlet duct 16 which is provided with a blower fan 18 driven by a motor 20. A catalyst member 22 is fitted directly on top of charbroiler 2 by a suitable support means 24 so that the cooking fumes arising from charbroiler 2 are constrained to flow through the parallel gas flow passages of catalyst member 22. Catalyst member 22 contains parallel gas flow passages which extend in the direction of the arrows a. The walls of the passages are coated with a catalytic material in accordance with the present invention. Under the action of blower fan 18 the fumes are drawn through the catalyst 22. The particulate contaminants in the fumes, i.e., atomized droplets of animal and/or vegetable grease, fats and oils, and the gas phase contaminants of the cooking fumes, i.e., the oxidizeable gases such as carbon monoxide and hydrocarbon-derived gases. These gases are oxidized within the catalyst 22 which may comprise a platinum oxidation catalyst component. The treated fumes are then discharged from outlet duct 16 to the atmosphere.

Optionally, a second catalyst, specifically for oxidation of the oxidizeable gases component of the cooking fumes may be used downstream (as sensed in the direction of cooking fumes flow) of the ceria-alumina catalyst of the present invention. This system for primarily treating particulate oil and grease fraction with the ceria-alumina catalyst and providing primary or supplemental treatment of the gas fraction of cooking fumes may comprise a ceria-alumina catalyst composition in accordance with the present invention arranged in series-flow communication relative to the cooking fumes to be treated, with a separate gas phase catalyst. Such a two-catalyst system is illustrated schematically in FIG. 5, where there is shown a conventional cooking range 26 on which articles of food 28, such as hamburgers, steaks, chicken, fish or other food items, are being broiled or fried. A fume exhaust system 30 is disposed above the cooking range 26 and comprises a hood 32 having a fume collecting inlet 32a. Hood 32 tapers inwardly in a direction moving upwardly away from cooking range 26 for connection to an outlet duct 34 which is provided with a blower fan 36 driven by a motor 38. A particulates phase catalyst composition 40 having parallel gas flow passages which extend in the direction of arrows a is fitted within hood 32 so that the cooking fumes arising from cooking range 26 are constrained to flow through the fine, parallel gas flow passages thereof, the walls of the passages being coated with a ceria-alumina catalytic material in accordance with the present invention. Under the action of blower fan 36 the fumes are drawn through particulates phase catalyst composition 40 and then into a gas phase catalyst composition 42. The particulate contaminants in the fumes, i.e., atomized droplets of animal and/or vegetable grease, fats and oils, are oxidized within particulates phase catalyst composition 40 and the gas phase contaminants of the cooking fumes, such as reactive organic gases, hydrocarbons and carbon monoxide, are oxidized within gas phase catalyst composition 42, the latter comprising a suitable gas phase oxidation catalyst, preferable one comprising a platinum oxidation catalyst component. The treated fumes are then discharged from outlet duct 34 to the atmosphere.

One or both of particulates phase catalyst composition 40 and gas phase catalyst composition 42 may be heated to attain a suitably elevated temperature to enhance the rate of catalytic oxidation. Thus, electrical heating means 44 are schematically illustrated as connected to particulates phase catalyst composition 40 and a heating jacket 46 is fitted about outlet duct 34 and the section thereof containing gas phase catalyst composition 42. Heating jacket 46 has a heated air inlet 46a and an air outlet 46b. Heated air, which may be obtained by providing cooking range 26 with a small air heater, is supplied to heating jacket 46 via inlet 46a and the cooled heating air is withdrawn through outlet 46b.

Figure 5:
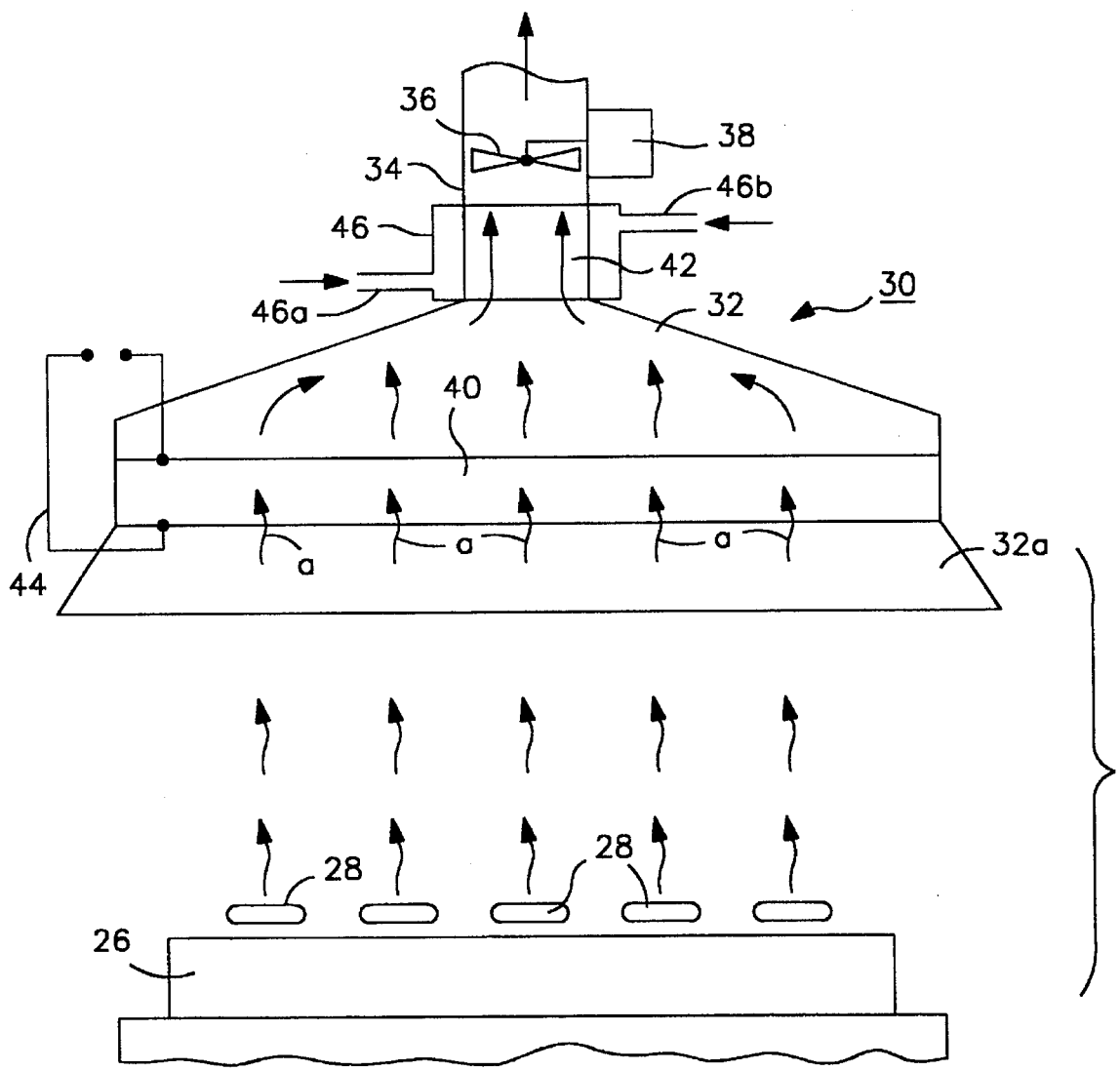
FIG. 5 is a schematic view of a restaurant char-broiler including a catalyst system for purifying cooking fumes in accordance with another embodiment of the present invention.

The schematic renditions of FIGS. 4 and 5 omit elements such as baffles, controls, etc., normally associated therewith.

A typical configuration for particulate phase catalyst composition 22 or 40 would be a substrate made of 321 stainless steel foil of 2 mil thickness configured to have hexagonal cross section gas flow passages ("cells") extending parallel to each other in a cell density of 64 cells per square inch, the substrate measuring 24 inches by 24 inches by 2 inches deep (61 cm×61 cm×5.1 cm deep) for a volume of 0.67 cubic feet (19 liters). The gas flow passages extend through the short dimension of the structure, i.e., the gas flow passages are 2 inches (5.1 cm) in length, and the walls thereof are coated with a thin, adherent layer of the ceria-alumina catalytic material in accordance with the present invention.

Example 1

Two samples of a combined ceria-alumina material are prepared by utilizing activated alumina having a nominal BET surface area of 150 $m^2$/g and aluminum-stabilized ceria having a nominal BET surface area of 164 $m^2$/g. The aluminum-stabilized ceria is attained by impregnating the ceria particles with a solution of an aluminum compound such as aluminum nitrate followed by calcining, to provide an aluminum content in the ceria of 1.35 weight percent aluminum, based on the total weight of ceria with the weight of aluminum calculated as the metal. Presumably, the aluminum is present as alumina. Aluminum-stabilized ceria is more resistant to thermal degradation than is unstabilized ceria. As is also well-known, alumina may also be thermally stabilized, usually by a similar impregnation of the alumina with precursors of rare earth metal oxides such as ceria. However, thermal stablization of the alumina is usually not necessary at the temperatures typically encountered in treating cooking fumes, i.e., from about 200° C. to about 600° C. The high surface area ceria particles and the high surface area alumina particles are placed in separate ball mills. A quantity of an amine-solubilized platinum hydroxide solution containing 0.2894 grams of platinum, a quantity of monoethanolamine ("MEA"), 97.5 cc of glacial acetic acid, 2.0 cc of an anti-foamant sold under the trademark NOPCO NXZ and about 1950 cc of deionized water are employed. About one-half the water and sufficient MEA to adjust the pH to at least about 7 are placed in the ball mill containing the alumina, which is milled to thoroughly blend the ingredients. Then, one-half of the platinum solution is added and ball milling is continued for about 5 minutes. Thereafter, glacial acetic acid and anti-foamant are added and milling is continued until a particle size of at least about 90 percent by weight of the particles having a diameter of less than about 12 microns is attained. The same process is separately repeated with the aluminum-stabilized ceria, except that MEA is not employed, including ball milling for mixing and to attain the same particle size of the ceria particles. The alumina and ceria slurries are then blended together to form a slurry of alumina and ceria particles in an alumina-to-ceria particle weight ratio of 7:6 (dry basis) containing a platinum compound.

Two samples were prepared: Sample A contained alumina and ceria in a weight ratio of 54 parts by weight alumina to 46 parts by weight ceria, and 0.01% platinum by weight, and Sample B contained alumina and ceria in a weight ratio of 54 parts by weight alumina to 40 parts by weight ceria and 0.04% platinum by weight. Samples A and B were prepared from slurries of particles of ceria and alumina and were dried and calcined to provide the samples in the form of powders. Three portions of 3 grams each of Sample A and Sample B were mixed with, respectively, 0.3 grams of corn oil, of canola oil and, as a comparison, with 0.3 grams of diesel lube oil.

Each of the six resulting samples of catalytic materials mixed with the respective oils were subjected to simultaneous thermogravimetric/differential thermal analysis ("TGA/DTA" analysis) to evaluate the ability of the catalytic materials to combust the oils thereon. Generally speaking, TGA/DTA analysis involves heating the sample and simultaneously observing the changes in weight and in the amount of heat evolved by the sample. The total weight loss relates directly to the amount of oil that leaves the catalyst material, either by evaporation or combustion. The amount of heat evolved indicates the relative amount of oil that is combusted. A thermocouple is used to detect the release of heat from the sample, and by monitoring and plotting the voltage produced by the thermocouple, a measure of the catalytic activity for the oxidation of the oil can be obtained. One useful measure is the area under the curve of the plotted exotherm peak, which, when scaled for the amount of catalyst and the amount of oil, gives a relative measure of the catalytic activity for the combustion of oil.

Figure 2:
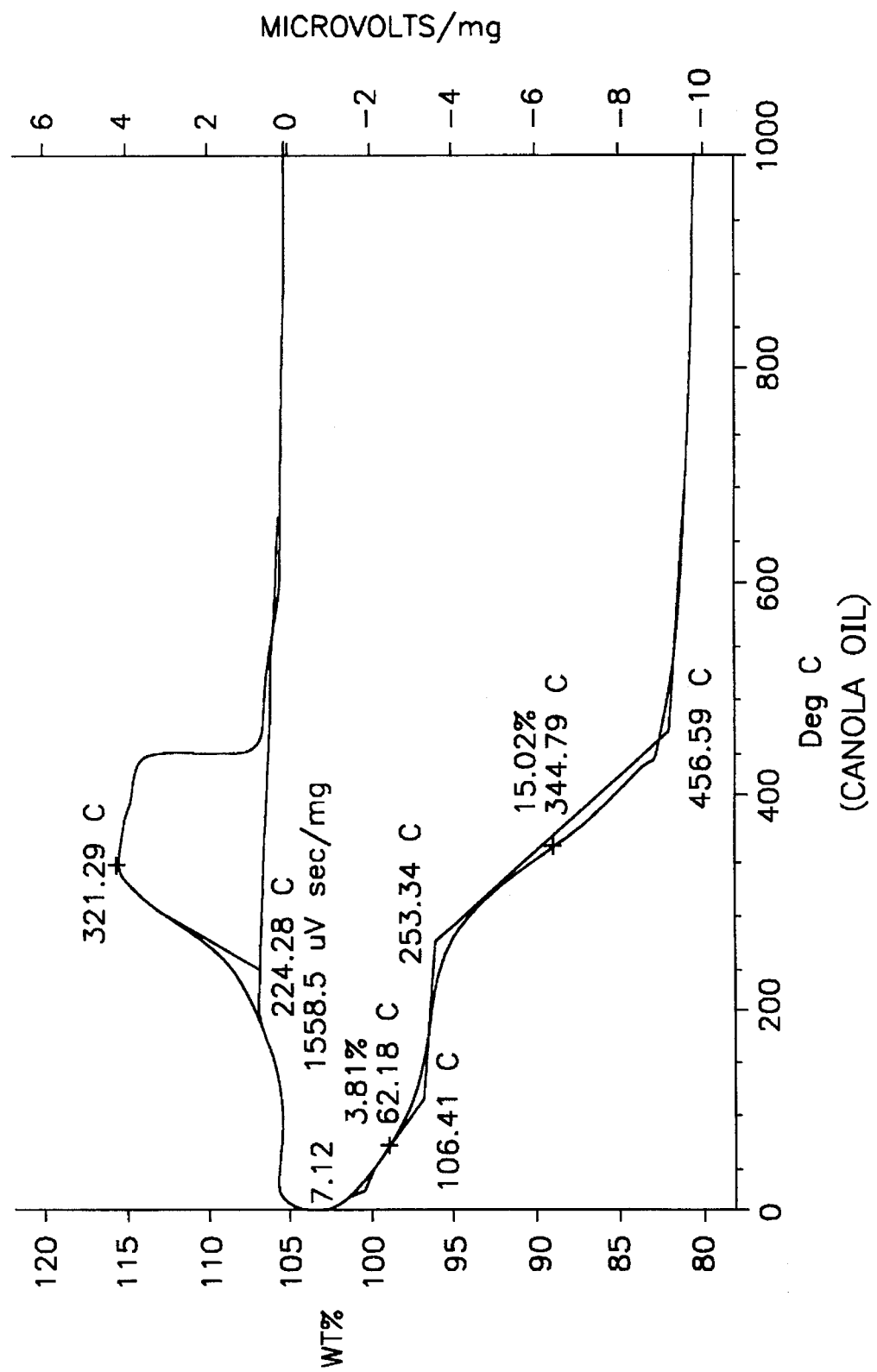
Figure 3:
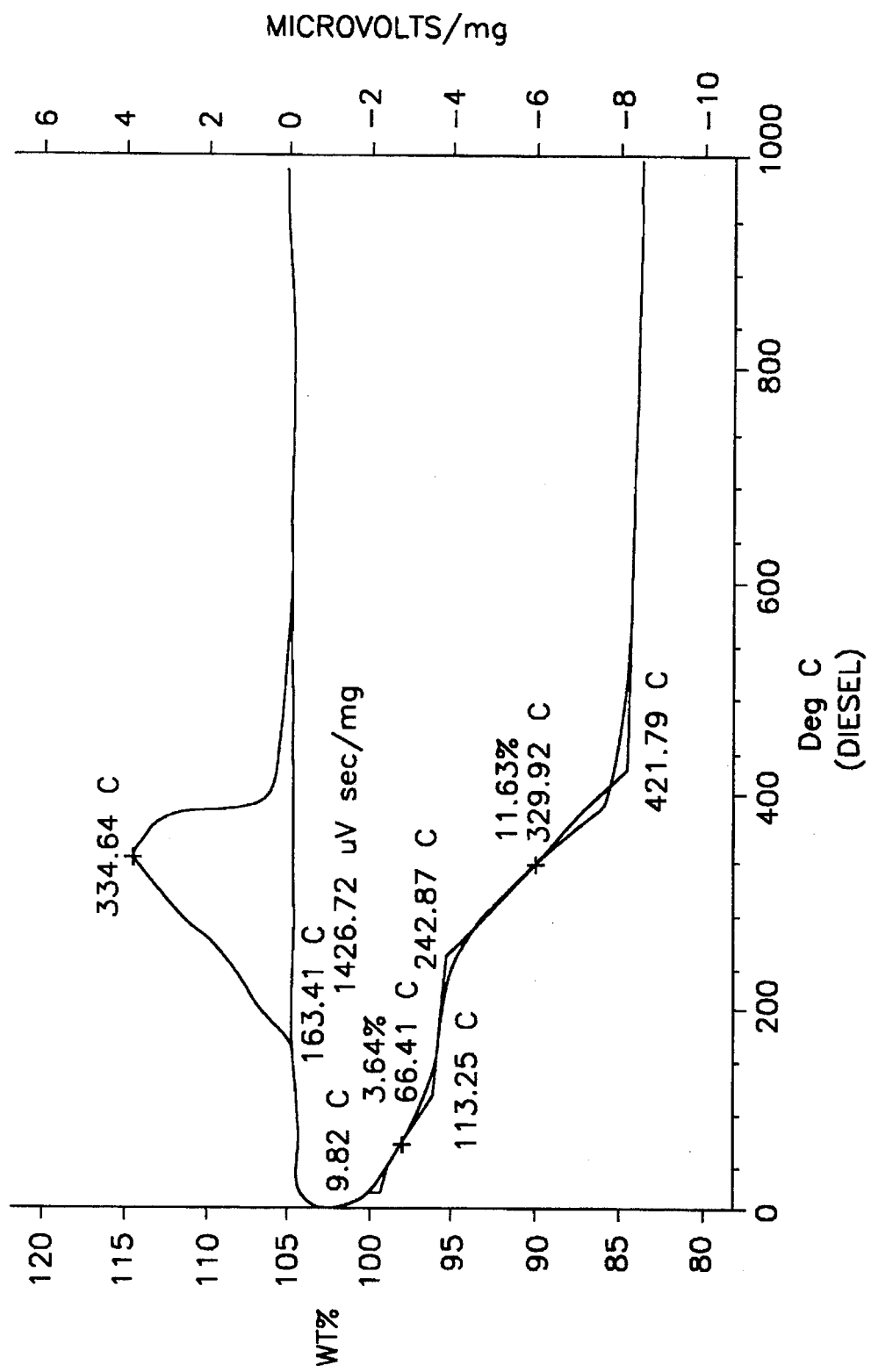

The TGA/DTA analysis plots for Sample A are shown in the attached FIGS. 1, 2 and 3 for the corn oil, canola and lube oil, respectively. The left-side ordinates provide a scale of the weight of the sample at various temperatures relative to the starting weight; the right-side ordinates show the release of heat from the sample measured in microvolts produced per milligram of sample. The relative DTA peak areas for both catalyst materials are given in TABLE I below.

TABLE I

| Catalyst Material | Relative DTA Peak Areas | | |
| --- | --- | --- | --- |
| | Corn Oil | Canola Oil | Lube Oil |
| A | 11338 | 10787 | 12731 |
| B | 12577 | 13552 | 12863 |

The data of FIGS. 1, 2 and 3 and of TABLE I show that the catalytic materials in accordance with the present invention are effective for the oxidation of common cooking oils at temperatures in the range of about 200° C. to about 400° C.

Example 2

A series of catalytic materials in accordance with the present invention were prepared by combining alumina-stabilized ceria and activated alumina of the type described in Example 1 but with no platinum or other catalytic metal added. The ceria comprised about 46 percent by weight of the ceria-alumina combination and the alumina about 54 percent by weight. Several samples of the ceria-alumina combination were taken for impregnation with varying quantities of platinum, which was carried out as described in Example 1.

The ceria-alumina catalytic materials were made into washcoat slurries as in Example 1. A cylindrical cordierite carrier measuring 1 inch in diameter, 3 inches in length and having 200 cells per square inch (cpsi) of end face area was immersed in one of the washcoat slurries, dried and calcined to yield catalyst members having washcoat and platinum loadings as follows: 1.840 grams washcoat per cubic inch with no platinum; 1.907 grams washcoat per cubic inch having 5 g Pt/ft$^3$; 1.835 grams washcoat per cubic inch having 14 g Pt/ft$^3$; 1.917 grams washcoat per cubic inch having 38 g Pt/ft$^3$; and 1.970 grams washcoat per cubic inch having 78 g Pt/ft$^3$. A separate platinum-containing ceria-alumina combination was prepared and coated onto a honeycomb monolith as described above at a washcoat loading of 1.99 g/in$^3$ to yield 78 g/ft$^3$ platinum, with the platinum dispersed only on the alumina.

A comparative or baseline alumina coating slurry was formed on the same type of cordierite as used for the above samples to provide a comparative sample containing alumina loaded at 1.85 g/in$^3$ in without platinum.

Test Procedure

Smoke was generated by dripping melted lard onto a metal crucible situated on a hot plate to heat the crucible to a temperature of at least 400° C. The smoke was directed upward through a vertical stainless steel reaction tube containing the catalyst members. A sample portion of the inlet fumes (about 7.8 liters/min at standard conditions of temperature and pressure) was diverted from the reaction tube inlet and was analyzed. The sample was flowed through three 47 mm Pallflex TX4OHI2O-WW teflon-backed glass fiber filters rated to 0.3 microns, in which particulate emissions (i.e., grease) were collected on the filters and weighed. The particulate concentration was calculated at about 30 ppm assuming an average molecular weight of 290, corresponding to a rate of particulate emission in the range of about 120–240 mg/hr. The sample inlet fumes were then flowed through a Rosemount 400A F.D hydrocarbon analyzer with which the hydrocarbon concentration was recorded in ppm referenced to methane. The reactive organic gas ("ROG") concentration was about 450 ppm by volume (methane basis) and the CO concentration was about 281 ppm.

The remaining inlet fumes were flowed through the test reactor at a rate of about 8.5 liters/min ("l/min"), corresponding to a space velocity of about 13,000/hr. The reaction tube was surrounded by a Lindbergh tube furnace to heat the catalyst member to temperatures of between 230° C. and 425° C.

The entire reactor effluent was passed through a series of three 0.3 micron filters, and to a hydrocarbon analyzer, and then to a gas chromatograph to measure carbon monoxide and carbon dioxide content. Observations were recorded at several temperatures, and the results are set forth below in the TABLE II.

TABLE II

| Ref.[1] Oxides | Pgm[2] Load (g/ft³) | Inlet[3] Temp. (°C.) | Avg.[4] Part. Conv. | Avg.[5] ROG Conv. | Avg.[6] CO Conc. |
|---|---|---|---|---|---|
| Comparative | | | | | |
| Al₂O₃ | — | 230° C. | 71.0% | 17.7% | 244 |
|  |  | 305 | 92.8% | 25.9% | 242 |
| Ceria/Alumina | | | | | |
| CeO₂/Al₂O₃ | — | 230 | 77.7% | 43.3% | 350 |
|  |  | 305 | 92.5% | 69.2% | 392 |
| CeO₂/Al₂O₃ | 5 | 230 | 84.3% | 64.3% | 132 |
|  |  | 305 | 93.7% | 96.2% | 0 |
|  |  | 425 | 97.9% | 97.6% | 0 |
| CeO₂/Al₂O₃ | 14 | 230 | 87.7% | 85.4% | 0 |
| CeO₂/Al₂O₃ | 38 | 230 | 83.5% | 95.8% | 0 |
|  |  | 305 | 93.1% | 97.8% | 0 |
|  |  | 425 | 98.1% | 99.4% | 0 |
| CeO₂/Al₂O₃ | 78 | 230 | 79.1% | 97.1% | 0 |
|  |  | 305 | 91.0% | 97.9% | 0 |
|  |  | 425 | 96.6% | 99.6% | 0 |
| CeO₂/Al₂O₃ | 78 (only on Al₂O₃) | 230 | 82.3% | 95.8% | 0 |
|  |  | 305 | 92.9% | 98.1% | 0 |
|  |  | 425 | 97.8% | 99.6% | 0 |

[1]Refractory oxides
[2]Platinum group metal loading (platinum, unless otherwise indicated)
[3]Temperature (°C.) of the reactor fumes.
[4]Average Particulate Conversion (the percentage of particulate originally present in the reactor inlet fumes which were converted to innocuous substances by the catalytic treatment.
[5]Average reactive organic gas component (ROG) Conversion. (The percentage of ROG originally present in the reactor inlet fumes which were converted to innocuous substances by the catalytic treatment.)
[6]Average CO Concentration (ppm by volume) in the reactor effluent.

The data of TABLE II show that the catalytic materials of the present invention are effective to reduce both the particulate and reactive organic gas components of cooking fumes. Variations in the platinum loadings had surprisingly little effect on average particulate conversion for the ceria-alumina refractory inorganic oxide materials. The apparently good particulate conversion attained by the alumina comparative composition without any platinum thereon is believed to be the result of adsorption of particulates onto the alumina without catalytic oxidation, and this belief was confirmed upon visual inspection of the catalyst member at the conclusion of the experiment, which showed the alumina to be darkly discolored by grease. Eventually, it is believed that the alumina would become saturated in use and incapable of further adsorption of particulates. In contrast, the ceria-alumina catalysts of the present invention were not darkened by grease to the extent that the alumina was.

In contrast to particulate conversion rates, the conversion rate for the reactive (oxidizeable) gas component of the fumes appears to vary with platinum loading at low temperature, i.e., 230° C. At higher temperatures, i.e., 305° C. and higher, there is relatively little difference in ROG conversion between catalyst materials comprising 5 or 6 g/ft³ platinum and 78 g/ft³ platinum.

The data also generally show that a small quantity of platinum is required to attain abatement of CO. In some operations, removal by oxidation of particulates is sufficient to meet required operating standards and catalyst compositions in accordance with the present invention without a platinum group metal thereon will be useful in such cases.

Example 3

A. Catalytic Materials

Two platinum-containing ceria-alumina catalytic materials were prepared generally as described above in Example 1. The catalytic materials were applied as washcoats onto metallic substrates and measuring 24 inches×24 inches×2 inches deep and having 64 hexagonal cells (each 2 inches in length) per square inch of end face area. The substates were made from 2-mil SS321 (321 stainless steel) foil and had a total volume of 0.67 ft³. The finished catalyst members were designated C and D. Catalyst member C comprised 1.23 g/in³ of ceria-alumina (46 weight percent ceria and 54 weight percent alumina) and 0.32 g/ft³ platinum. Catalyst member D comprised 1.50 g/in³ of ceria-alumina (46 weight percent ceria and 54 weight percent alumina) and 30 g/ft³ platinum. Catalyst members C and D each further comprised an alumina undercoat disposed on the carrier beneath the ceria-alumina coating. The alumina undercoat enhances adhesion of the ceria-alumina combination to the carrier, and is applied by immersing the carrier in an aqueous slurry of alumina particles, removing excess slurry, and then drying and calcining the alumina-coated carriers before applying the ceria-alumina combination. The alumina undercoat of catalyst members C and D were each present in the amount of 0.45 to 0.50 g/in³.

The catalyst members were tested by using them to treat cooking fumes from the broiling of frozen, uncooked hamburgers on a NIECO Model 960 natural gas charbroiler, which is a broiler commonly used in fast-food restaurants. The broiler was placed below a Graylord exhaust hood rated for 1000 CFM total exhaust with a static pressure of one and one-half inch water column (1.5" WC). The catalyst members were placed directly above the charbroiler, and the cooking fumes were passed through the catalyst members.

Approximately 9.6 l/min. of effluent from the catalyst members was withdrawn through a probe and passed through a series of filters and then to a hydrocarbon analyzer. The first filter was a Whatman multigrade GMF 150 filter 47 mm in diameter, designed to retain particles larger than 1 micron and to prevent an increase in pressure drop as the filter cake builds. The second and third filters were also 47 mm in diameter, and were Pallflex filters rated at 0.2 microns. After flowing through the filters, the gas sample was flowed to the hydrocarbon analyzer, where the hydrocarbon, i.e., ROG, content was recorded as ppm methane.

Each catalyst was tested twice with a series of 150 hamburgers. In addition, the cooking process was performed without any catalyst member in the exhaust hood to provide reference particulate and hydrocarbon levels. Emissions are expressed in units of milligrams per pound of meat cooked. For particulates, the total weight of particulates collected on the filters is divided by the total precooked weight of the meat. For hydrocarbon content, the ppm of hydrocarbon-derived gases (measured as methane equivalent) generated during the cooking are given as totals; this is multiplied by the total average sample gas flow rate to yield total liters of unburned hydrocarbon generated for the test. This value is converted to milligrams of unburned hydrocarbon per pound of meat cooked (precooked weight basis).

In testing the catalyst members, baffles were placed between the burners and the catalyst members to provide more uniform heat distribution. The results are set forth below in TABLE III.

TABLE III

| Catalyst Member | Trial | Part.[1] Content mg/lb | Part.[2] Reduction % | Total[3] UHC mg/lb | UHC[4] Reduction % |
|---|---|---|---|---|---|
| (NONE) | 1 st | 2.68 | — | 7.29 | — |
|  | 2 nd | 2.81 | — | 6.88 | — |
| C | 1 st | 0.314 | 88.8 | 0.647 | 90.9 |
|  | 2 nd | 0.273 | 90.3 | 0.695 | 90.2 |
| D | 1 st | 0.296 | 89.5 | 0.106 | 98.5 |
|  | 2 nd | 0.213 | 92.4 | 0.073 | 99.0 |

[1]Particulate Content of the Emissions
[2]Particulate Reduction by Catalyst Member
[3]Total UHC (Unburned Hydrocarbons), i.e., ROG Emissions
[4]Reduction of UHC by Catalyst Members The data of TABLE III show that a ceria-alumina catalytic material in accordance with the present invention comprising a relatively small quantity of platinum (0.32 g/in$^3$) is highly effective for the reduction of particulate matter in cooking fumes, and that the further addition of platinum, even a one hundred-fold increase (30 g/in$^3$), has little effect toward improving the removal of particulate matter from the cooking fumes. On the other hand, significant improvement was seen with regard to the reduction of gaseous unburned hydrocarbons and ROG phase of the cooking fumes, by increasing the platinum.

While the invention has been described in detail with respect to specific preferred embodiments thereof it will be appreciated that variations thereto may be made which nonetheless lie within the scope of the invention and the appended claims.

What is claimed is:

1. A method for treating fumes produced by cooking foodstuffs by oxidizing at least oxidizeable particulate components of the fumes comprises contacting the fumes with a catalyst composition at a temperature high enough to oxidize at least some oxidizeable particulate components of the fumes, the catalyst composition comprising a refractory carrier on which is disposed a coating of a ceria-alumina catalytic material comprising a combination of bulk ceria having a BET surface of at least about 10 m$^2$/g and bulk alumina having a BET surface of at least about 10 m$^2$/g, and from 0 to about 0.5 g/ft$^3$ of a catalytic metal component dispersed thereon.

2. The method of claim 1 wherein the catalytic metal component is present and comprises one or more Group VIII metal components.

3. The method of claim 2 wherein the catalytic metal component comprises one or more platinum group metal components.

4. The method of claim 1 wherein the bulk ceria and the bulk alumina each comprises from about 5 to 95 percent by weight of the combination.

5. The method of claim 1 wherein the bulk ceria and the bulk alumina each comprises from about 35 to 65 percent by weight of the combination.

6. The method of any one of claims 1 through 5 wherein the bulk ceria and the bulk alumina each has a BET surface area of from about 25 m$^2$/g to 200 m$^2$/g.

7. The method of claim 1 or claim 2 wherein the bulk ceria comprises aluminum-stabilized bulk ceria.

8. The method of claim 1 or claim 2 wherein the bulk ceria and the bulk alumina are each disposed in respective discrete layers, one overlying the other.

9. The method of claim 1 or claim 2 wherein the bulk ceria and the bulk alumina are in intimate admixture with each other.

10. The method of claim 1 or claim 4 wherein the catalytic metal component is present and comprises a catalytically effective amount of platinum group metal component.

11. The method of claim 10 wherein the platinum group metal component comprises platinum in an amount of at least about 0.1 g/ft$^3$ of the composition.

12. The method of any one of claims 1 through 5 including contacting the fumes with the catalyst composition at a temperature of from about 200° C. to 600° C.

13. The method of claim 12 including contacting the fumes with the catalyst composition at a temperature of from about 200° C. to 400° C.

14. The method of any one of claims 1 through 5 wherein the fumes comprise oxidizeable gases and further including contacting the fumes with a gas phase oxidation catalyst after contacting the fumes with the catalyst composition so as to oxidize at least some of the oxidizeable gases by contact with the gas phase oxidation catalyst.

15. The method of claim 14 including continuously heating the gas phase oxidation catalyst to a temperature of from about 300° C. to 600° C. to enhance its catalytic activity.

16. A method for treating fumes produced by cooking foodstuffs by oxidizing at least oxidizeable particulate components of the fumes comprises contacting the fumes with a catalyst composition at a temperature high enough to oxidize at least some oxidizeable particulate components of the fumes, the catalyst composition comprising a refractory carrier on which is disposed a coating of ceria-alumina catalytic material comprising a combination of bulk ceria having a BET surface of at least about 10 m$^2$/g and bulk alumina having a BET surface of at least about 10 m$^2$/g, and from about 5 g/ft$^3$ to about 80 g/ft$^3$ of a platinum catalytic metal component dispersed thereon.

17. A method for treating fumes produced by cooking foodstuffs by oxidizing at least oxidizeable particulate components of the fumes comprises contacting the fumes with a catalyst composition at a temperature high enough to oxidize at least some oxidizeable particulate components of the fumes, the catalyst composition comprising a refractory carrier on which is disposed a coating of ceria-alumina catalytic material comprising a combination of bulk ceria having a BET surface of at least about 10 m$^2$/g and bulk alumina having a BET surface of at least about 10 m$^2$/g, and from about 0.1 to 200 g/ft$^3$ of a palladium catalytic metal component dispersed thereon.

* * * * *